April 21, 1953   E. R. MAURER ET AL   2,635,480
COMBINED PLANETARY AND COUNTERSHAFT
TRANSMISSION AND CONTROLS THEREFOR
Filed June 24, 1949   3 Sheets-Sheet 1

INVENTORS.
Edwin R. Maurer.
Augustin J. Syrovy.
BY
Harness & Harris
ATTORNEYS.

Patented Apr. 21, 1953

2,635,480

UNITED STATES PATENT OFFICE 2,635,480

COMBINED PLANETARY AND COUNTERSHAFT TRANSMISSION AND CONTROLS THEREFOR

Edwin R. Maurer and Augustin J. Syrovy, Detroit, Mich., assignors to Chrysler Corporation, Highland Park, Mich., a corporation of Delaware Application June 24, 1949, Serial No. 101,118

23 Claims. (Cl. 74—472)

This invention relates to vehicle power transmissions of the type including tandemly-arranged change speed units and having controls for effecting speed ratio changes therein.

It has heretofore been suggested to arrange a planetary gear underdrive or overdrive ahead of countershaft gearing each providing a speed ratio change. Although such arrangements have been satisfactory, it is found that where an overdrive arrangement has been utilized the fast speed ratio drive has necessarily been through gearing, this contributing to power losses and gear noise. Moreover, lubrication of the thrust taking members has been difficult and a high speed propeller shaft had to be used. On the other hand, where an underdrive planetary has been employed, servo power shifting of both units and extensive controls have been an essential part of the transmission.

It is the general object of the present invention to provide a transmission of simplified character, easily controlled and avoiding the aforesaid conditions.

Thus it is an object to provide a transmission having a planetary underdrive mechanism ahead of a countershaft change speed mechanism incorporating a centrifugal pawl clutch mechanism, the planetary being shiftable between a slow speed ratio "underdrive" and a fast speed ratio, "direct" under control of power actuated servo-mechanism, at predetermined vehicle speed, and the countershaft mechanism being shiftable at predetermined speed between a slow speed ratio "underdrive" and a fast speed ratio "direct" at predetermined vehicle speed by operation of the pawl clutch mechanism.

Another object is to provide a transmission of this character arranged to provide an automatic upshift in the planetary from the slow to the fast drive ratio during vehicle drive followed by a driver controlled upshift in the countershaft mechanism from the slow to the fast drive ratio therein and to provide normal downshifts in the reverse order when slowing down in speed and an enforced downshift in the planetary under driver control when quick acceleration is required.

Another object is to provide a transmission of the above character wherein the planetary shift mechanism is controlled to effect an automatic downshift at a vehicle speed preferably immediately under the vehicle speed at which the centrifugal pawls are retractable, for example, 2 M. P. H. under the pawl disengaging speed, such providing when coming to a stop a double downshift through the planetary and countershaft mechanism, without jolt or discomfort to the vehicle passengers.

A further object is to utilize the foregoing downshift control to facilitate disengagement of the pawls of the centrifugal clutch under conditions of operation where some holding torque exists on the pawls, the planetary mechanism then downshifting first and providing thereby a momentary interval of no-drive to relieve the holding torque on the pawls and permit their retraction, the sequence of downshifting in this case being downshift in the planetary unit then downshift in the countershaft unit, at least one positive downshift being assured at the moment when required to thereby avoid engine stalling, for example, where no fluid drive is utilized in conjunction with the transmission.

Another object is to supplement the above downshift control when excessive holding torque exists on the pawls by providing means operable in response to operation of the planetary downshift control means for momentarily interrupting the delivery of engine power to further relieve said holding torque.

Other objects and advantages of our invention will become apparent from the following description and the drawings showing one exemplification of our invention wherein:

Figure 6 is a diagrammatic view of the hydraulic and electrical control system for our transmission.

Figures 1, 3:
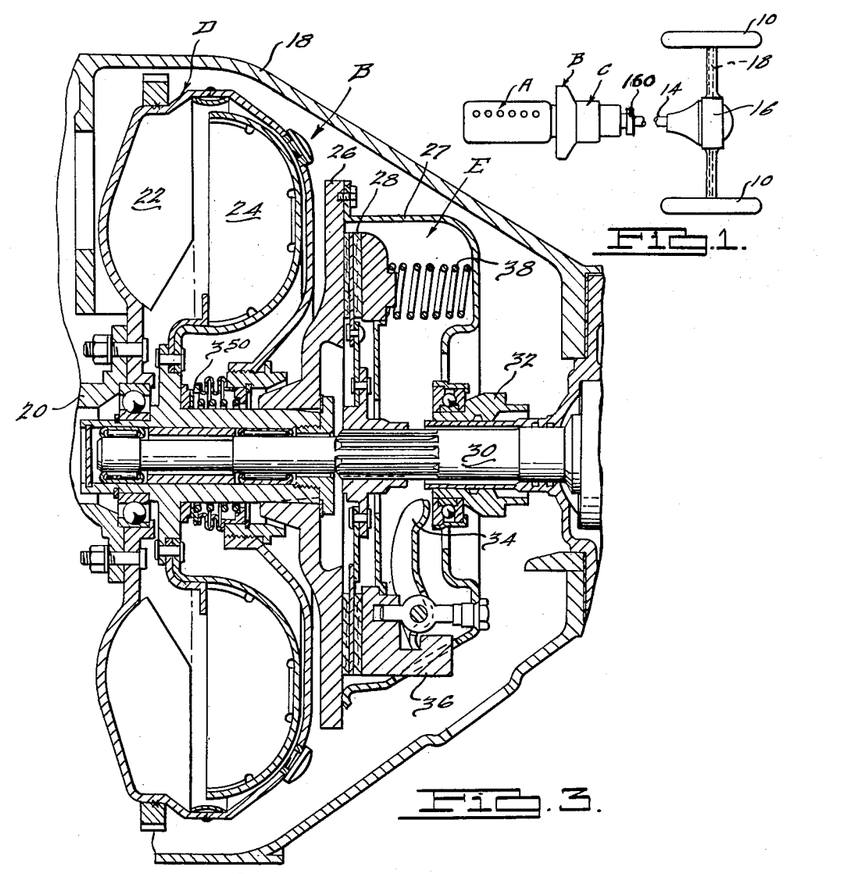
Figure 1 is a diagrammatic showing of the power plant and drive mechanism of a vehicle incorporating the present invention.
Figure 3 is an enlarged cross sectional view of a portion of the mechanism of Figure 1.

Referring now to the drawings wherein similar reference characters are used to designate corresponding parts of the structure, Figure 1 illustrates a typical arrangement of the transmission mechanism in a vehicle embodying the same. As seen in Figure 1 the vehicle engine A is coupled to the driving wheels 10 of the vehicle through a fluid power transmitting and main clutch unit B shown in greater particular in Figure 3 and a change speed gearing C shown in detail in Figures 4 and 5.

The mechanism C provides six speeds forward and two in reverse. The output shaft 12 of the unit C is connected by means of the usual propeller shaft 14 with a conventional differential gear box 16 that drives the axle shafts 18. An axle shaft ratio between 3.3 and 3.5 is preferred.

As best seen in Figure 3, we preferably arrange for transmitting drive from the engine A to the transmission C through clutch means B contained in a housing 18 and comprising a fluid power transmitting device such as the fluid coupling D of the kinetic type, preferably in conjunction with a releasable main clutch E of conventional design to facilitate manual shifts in the transmission C.

Figure 2:
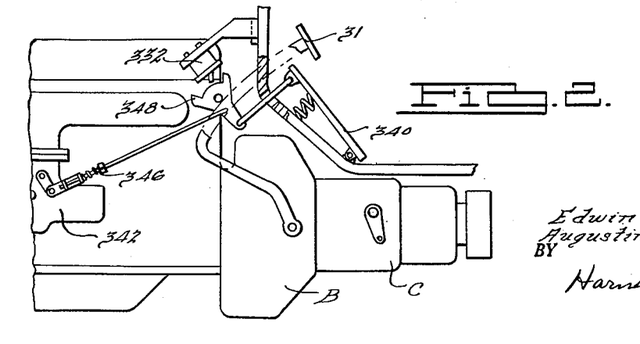
Figure 2 is a side elevational view of the power plant and transmission.
Figure 3:
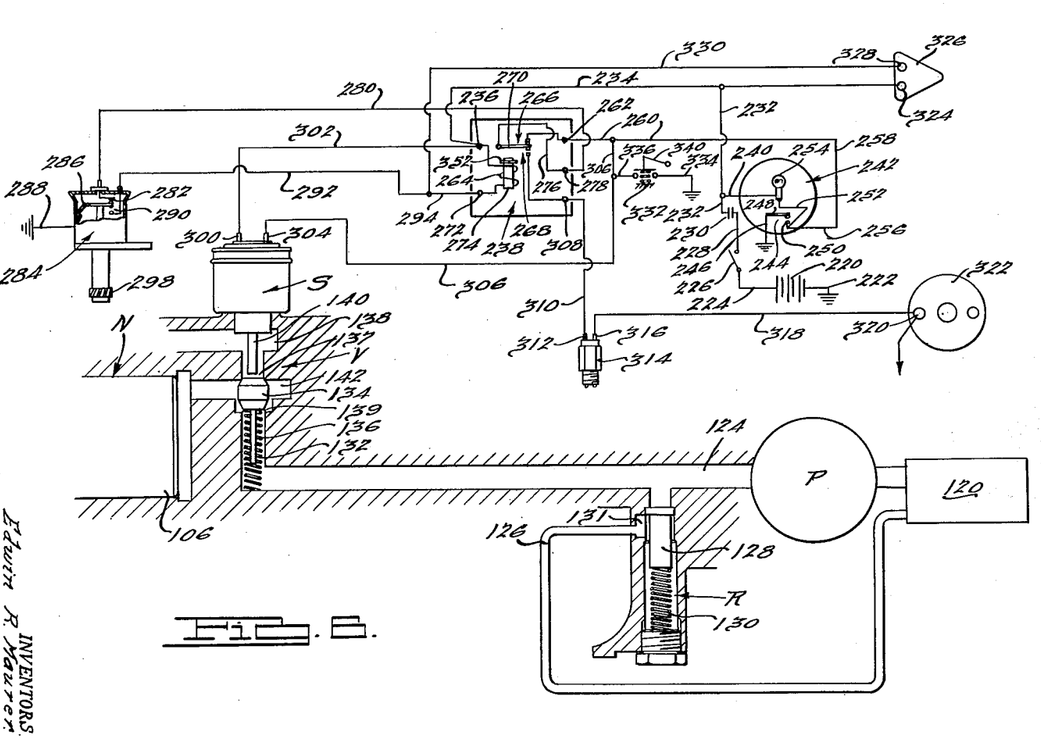

The engine crankshaft 20 (Figure 3) drives the coupling impeller 22 to circulate fluid in its vaned passages to drive the vaned runner 24 in a manner well known for fluid couplings of the type illustrated. The runner 24 drives the input member or driving plate 26 of the main clutch E, which as illustrated, is of the friction type. As also shown, the driving plate 26 is drivingly connected with a clutch housing member 27. The driven member or mat 28 of the friction clutch E is fixed to the first intermediate shaft 30 of the transmission and is drivingly disengaged by depressing a clutch pedal 31 (Figure 2) which slides the throwout member 32 forwardly to operate the lever 34 to unload the pressure driving plate 36, springs 38 loading this plate and engaging the clutch when the clutch pedal 31 is released.

Shaft 30 extends rearwardly into portion 18A of the housing or casing of the transmission C where it constitutes the input drive member of a planetary change speed mechanism generally designated by the letter F. It is rotatably supported by a ball bearing 42 carried by a housing plate 44, and is formed in the bearing 42 with a bell-shaped end portion 46. The portion 46 carries a radially extending flange 48 having a toothed periphery adapted to mesh with internal teeth of an annulus gear 50 of the planetary mechanism F. The annulus gear 50 has external teeth or splines 52 adapted to receive a plurality of rigid friction clutch plates 54 of a disc clutch generally designated by the numeral 55 and has a rigid bearing plate 56 mounted on the forward portion of the annulus member adjacent the plates 54. Dished resilient plates 58 are mounted about the annulus gear 50 adjacent the bearing plate 56 and are held endwise by a snap ring 60. The friction plates 54 are adapted to be engaged with other friction clutch plates 62 when a planetary control or throwout member generally designated by the numeral 64 is shifted forwardly to force the bearing plate 56 into engagement with the spring plates 58 by a fluid pressure operated motor generally designated by the letter N. A second intermediate transmission shaft 66, which is the output shaft of the planetary, has its forward end rotatably supported within the bell-shaped rearward end 46 of the first intermediate shaft 30. The rearward end of the shaft 66 is rotatably supported by a bearing 68 carried by the housing portion 18B of the transmission C.

A planetary carrier or spider member 72 is splined to the forward portion of the intermediate shaft 66 and a bushing 74 rotatably separates the carrier from the shaft portion 46. Carrier 72 mounts a plurality of planet pinions 76 carried by axles 78. The teeth of the planetary pinions mesh with the internal teeth 79 of the annulus gear 50 and also mesh with the teeth of a sun gear 80 which is rotatably journalled on the intermediate shaft 66.

The sun gear 80 has a rearwardly extending cup-shaped portion 82 provided with external splines or teeth 84, a smooth internal surface 86 forming the outer race of an overrunning brake mechanism generally designated by the letter K and which is located drivingly intermediate the sun gear extension 82 and the axially extending flange 88 of the housing plate member 90 secured by bolts 92 to the forward end wall 70 of the housing portion 18B of the transmission. Rollers 94 are held in spaced relation by a carrier 96 and spring means 98 are provided to urge the rollers into driving engagement with the outer race 86 and cams 100 on the extension 88. This mechanism K permits the sun gear 80 to overrun the housing plate flange 90 in a clockwise direction of rotation (looking rearwardly) but prevents overrunning between these parts in a counterclockwise rotational direction. Stated otherwise, it holds the sun gear from reverse rotation.

The planetary control means 64 is splined on teeth 84 of the sun gear extension 82 and comprises a forwardly extending clutch operating spider 102, a rearwardly extending brake operating member 103, a ball bearing 104 mounted on the hub 105 of the spider 102 and a stepped piston 106 surrounding the bearing 104 and slidably engaging the stepped cylinder 107 of the casing portion 18A of the transmission.

The spider 102 is substantially bell-shaped and mounts an annulus member 108 having internal splines 110 adapted to receive the rigid clutch plates 62 for rotation therewith. As previously stated, the clutch plates 62 are adapted to engage with the plates 54 when the control member 64 is moved forwardly by the motor N. Substantially simultaneously with such engagement the bearing plate 56 is forced against the dished spring plates 58 and by reason of the gradual pressure resistance provided by the plates 58 a smooth quiet engagement of the clutch plates 54, 62 is possible.

The brake operating member 103 has a frusto-conically-shaped outer peripheral surface designed to support a friction brake element 114, which is mounted thereon. This brake element is adapted to engage a frusto-conically-shaped complementary inner peripheral surface 116 of the casing portion 18A when the planetary control means is shifted rearwardly for holding the sun gear from rotation in either direction. The chief function of this brake 114 is to prevent freewheeling of the transmission during vehicle coasting. Since the coast load is much less than the driving torque in underdrive, the friction brake 114 is adequate for this coast purpose. In underdrive the brake K acts to hold the sun gear from reverse rotation and the friction brake 114 assists. Under either condition of operation the sun gear is held from rotation such that when the engine is driving, the intermediate shaft 66 is driven by the shaft 30 through the planetary gearing at a reduced speed ratio. On the other hand, during vehicle coast the intermediate shaft 66 becomes the driver and will drive the drive shaft 30 through the planetary gearing at an overspeed relative to the intermediate shaft 66. Moreover, in either case a two-way gearing drive is provided.

A hydraulically operated power shift motor is provided to shift the control means 64 forwardly to engage the disc clutch mechanism for establishing direct drive in the planetary while springs 118 serve to release the clutch when the motor is vented.

The annular-shaped stepped piston 106 of the motor N is reciprocable in the stepped cylinder 107 formed by the casing portion 18A. The piston is provided with sealing rings 120 and 122 and suitable means, not shown, are carried by the piston to prevent rotation thereof relative to the casing. A plurality of circumferentially arranged springs 118 are disposed between the piston 106 and the housing plate 44 and act to urge the piston rearwardly to its underdrive position shown in Figure 4 when the motor N is vented. Pressure fluid admitted to the motor N by means to be described will cause the piston 106 to move forwardly to compress the springs 118 and simultaneously shift the control member 64 forwardly to disengage its brake member 114 and engage its clutch member 102 with the annulus gear 50 of the planetary unit by effecting engagement of the clutch plates 54 and 62. It will be observed that the bearing 104 permits rotation of the control member 64 relative to the piston 106 at all times when the brake 114 is disengaged.

Figure 6 shows in schematic form the differential fluid pressure system which may be positive pressure or vacuum, the former being preferred, for operating the planetary control means 64. As seen in Figure 6 oil from a suitable supply source 120 which may be the transmission sump, is delivered under pressure from the pressure chamber of the pump P into a pressure line or passage 124. Tapped into the side of the passage 124 is a piston-type relief valve, generally designated by the letter R for returning oil to the sump via a passage 126 when the piston 128 of the valve is moved against the resistance of spring 130 by the pressure fluid to uncover the port 131. The valve R regulates the pressure supplied from pump P and also serves as a return for the pressure fluid when the pump is operating but the power motor N is not functioning, i. e., is vented. The passage 124, as seen in Figure 6, connects with a second passage 132 of a valve mechanism generally designated by the letter V and which includes a piston 134 operable by a spring 136 to close a port 137 of a fluid passage 138 having connection with the oil sump or operable to close the port 139 of the passage 132 when operated against the force of the spring 136 by a solenoid S. The solenoid S when energized as hereinafter described, has its movable core member 140 actuated against the piston 134 to close the port 139. Intermediate the ports 137 and 139 of the passages 138 and 132 respectively, is a passage 142 surrounding the piston 134 and which connects with the cylinder 107 of the power motor N when the vent passage 138 is closed by the piston 134 and pressure fluid is being directed to the cylinder 107 through the passages 132 and 142.

The countershaft mechanism in the casing 18B of the transmission C will now be described. It will be noted that the intermediate shaft 66 extends rearwardly into the housing 18B where it is supported by the ball bearing 68 and is formed with a main drive pinion 150 at its inner end. Also formed on the rearward end of the shaft 66 adjacent the pinion 150 is an annular extension 152 to which is splined a pawl carrying member or core 154 of a centrifugal type pawl clutch generally designated by the letter G. A spring ring 155 holds this member in position. The rearward end of shaft 66 is hollow and journals by the needle bearing 156 the forward end 158 of the transmission driven shaft 12 which carries at its opposite end a propeller shaft brake drum 160 (Figure 1).

The drive pinion 150 is in constant mesh with a gear 162 for driving the countershaft cluster 164 for rotation on a countershaft 166 supported in the end walls 70, 167 of casing portion 18B. The cluster 166 includes an intermediate speed pinion 168, a low speed pinion 170, and a reverse drive pinion 172.

The pinion 168 constantly meshes with a gear 174 journalled for rotation on the shaft 12. This gear has a set of integral external clutch or drive control teeth 176 adapted for interengagement with the internal teeth 178 of a manually shiftable clutch sleeve or member Q, which is adapted to be shifted rearwardly, axially of the shaft 12 from its neutral position shown in Figure 4 to engage the teeth 176 or forwardly to engage a set of integral external clutch or drive control teeth 180 of a windowed shell 182 of the centrifugal clutch G. The sleeve Q is axially movable through a yoke member 184 by suitable manual selector means not shown. The clutch sleeve Q is slidably and non-rotatably carried on a splined hub member 186, which is splined to the shaft 12 at 188. Moreover, the shell 182 is loosely journalled and axially movable on a bushing 190 carried by the shaft 12. This shell is preferably provided with eight pawl receiving windows 192 equally spaced around the periphery of the shell. An overrunning roller clutch J is provided drivingly between the intermediate gear 174 and the shaft 12. The clutch J comprises an enlarged forwardly extending portion 194 of the gear 174 provided with a smooth annular bore or surface 196 constituting the outer runway or driving surface for the roller clutch J. The inner race comprises a collar 198 directly splined to the shaft 12 and having a cammed surface 200 on which rollers 202 are carried. The rollers are retained in a cage 204 having a rearward slotted annular extension 206 for separating the adjacent rollers. The cage is also provided with a radially extending finger 208 extending into juxtaposition with the sleeve Q for control thereby. Suitable springs are provided to bias the rollers into locked-up or driving position between the cammed surface 200 and the inner race 196 of the gear 174 to thereby establish a one-way driving connection between the gear 174 and shaft 12 when the gear 174 rotates in a counterclockwise direction looking forwardly of the transmission, while permitting overrun of the shaft 12 with respect to the gear 174 upon slowing down of the gear 174 below the rotative speed of the shaft 12.

As previously stated, operation of the clutch J is under control of the sleeve Q. In the neutral position of the sleeve shown in Figure 4 the projection 208 of the roller cage is rotated by sleeve camming teeth to a position such that the rollers 202 are prevented from engaging the cammed surfaces 200 of the inner race and underdrive is impossible in either direction through the overrunning clutch J. In the rearward or two-way drive position of the sleeve Q the projection 208 is retained by the sleeve Q in the same no-drive position. In the forward or freewheel drive position of the sleeve Q the sleeve Q camming teeth are moved out of the path of the projection 208 so that the roller cage may assume the position with the rollers 202 engaged with the cammed surfaces 200 of the inner race to obtain a one-way drive through the clutch J from the gear 174 to the shaft 12. Manifestly when returning the sleeve Q to neutral position the cage of the overrunning clutch J will be again rotated to the no drive position.

The intermediate speed gear 174 conically journals a toothed blocker synchronizing member 210 and the shell 182 conically journals a similar member 212. Each of these is located intermediate the clutch teeth of its carrying gear or shell respectively and the sleeve Q and is frictionally engaged with its carrying member through its conical journal by means of a spring 214. Each blocker member also has a tooth and slot connection with the hub 186 to provide for a limited relative rotative movement or oscillation between the blockers and the hub 186. It will be understood that the clutch teeth 180 are engageable by the teeth 178 of the clutch sleeve Q when the relative speeds of the sleeve and the shell are synchronous; that during asynchronous speed conditions forward shift of the sleeve Q is blocked by the member 212, by reason of the relative permissible movement between the blocker and hub 186. Similarly the member 210 serves to block rearward shift of the sleeve Q when the relative speeds of the sleeve Q and the gear 174 are asynchronous.

The centrifugal clutch G, as previously indicated, comprises a pawl carrier 154 driven by the pinion 150, the former carrying a plurality of pawls 212, two being shown. The opposite pawls 212 are radially movable outwardly oppositely to one another in response to centrifugal force to engage the windows 192 of the shell 182 to establish a two-way direct drive between the shafts 66 and 12 when the clutch sleeve Q is engaged with the clutch teeth 180 of the shell.

In order to return the pawls to the disengaged position shown in Figure 4 below a predetermined speed of rotation of the pawl carrier 154 a normal retracting bias is applied to the pawls to oppose their centrifugal tendencies in the speed range wherein disengagement of the pawls is desired. For this purpose, control or governor means comprising compression springs 215, more particularly disclosed in the patent to E. R. Maurer 2,343,312, granted March 7, 1944, are provided to urge the pawls to retracted position. Adjustment of the engaging speed of the pawls by replacing the springs with new ones of different force value or by means of adjustment screws shown in the Maurer patent is also contemplated. The pawl engaging windows 192 are preferably arranged such that diametrically opposite windows will simultaneously register with the pawls 212 so as to receive the pawls under the conditions hereinafter described.

The pawls are preferably provided with a slight chamfer or ramp at their outer head portions to reduce ratcheting tendencies when the pawls are free to engage. A combined blocker, drag member, balk or synchronizing ring 214 is also provided for preventing pawl engagement until the rotative speeds of the pawls and shell are synchronized and for preventing the establishment of a drive connection between the shafts 66 and 12 through the freewheel clutch J under high engine idle conditions as when the car is at a standstill, and a forward shift of the sleeve Q is either accidentally or deliberately attempted without first releasing the main clutch E and synchronizing the speeds of the shafts. The control over the pawl engagement is effectuated through pins or projections 216 on the pawls which are engageable with the balk ring 214.

For a more complete description of the sleeve clutching mechanism and the centrifugal pawl clutching mechanism, reference is made to the copending application of Bucy et al. Serial No. 16,214, filed March 22, 1948.

Figures 4, 5:
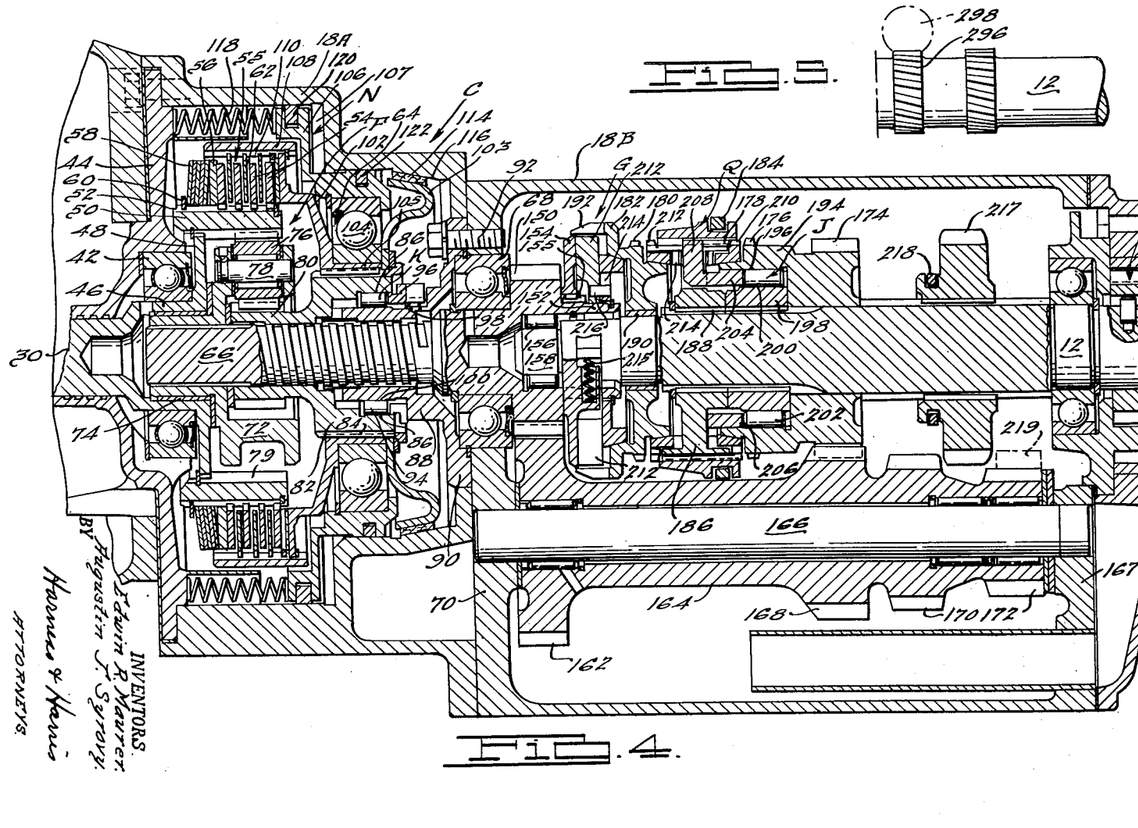
Figure 4 is a cross sectional elevation of the transmission of our invention, parts being broken away.
Figure 5 is a fragmentary view of the output shaft of the transmission of Figure 4 showing the governor and speedometer drive gears.

Our transmission provides for an emergency low and reverse drive in the transmission C by means of a slidable gear 217 which may be moved by manual selector means, not shown, operating upon the yoke 218 to shift the gear forwardly from its neutral position shown in Figure 4 to engage with the low speed pinion 170 to establish emergency low speed ratio or to move the same rearwardly from its neutral position to engage with an idler gear 219 which is in constant mesh with the reverse gear 172 to establish reverse drive in the transmission.

Figure 6 in addition to showing the hydraulic controls for the transmission also diagrammatically shows the electrical control circuits.

It will be seen from the diagram that the vehicle battery 220 or other source of current is connected to ground on the vehicle frame through a conductor 222. The other side of the battery is connected by a conductor 224 to the ignition switch 226. The ignition switch is connected by a conductor 228 to a circuit breaker 230 which in turn is connected by the conductors 232, 234 with one terminal 236 of a relay generally designated by the numeral 238. The circuit breaker 230 is also connected through the conductor 232 and a second conductor 240 with a dash mounted mountain switch mechanism generally designated by the numeral 242 and which includes a manually operable normally open snap switch 244, one side of which is connected to ground by the conductor 246, this conductor connecting with a contact 248 and the other side of which switch includes a contact 250 connected by the conductor 252 to one side of a lamp 254, also located on the dash, the other side of which connects with the aforementioned conductor 240. It will be evident that the lamp is in series with the switch 244 such that when the switch 244 is closed and current flows therethrough, the lamp will be lighted to indicate that this switch is in operation for the functions, to which reference will hereafter be made. The contact 250 of the mountain switch is also connected by conductors 256, 258, and 260 with a terminal 262 of the relay 238. The relay 238 includes a field coil 264, and switches 266 and 268 operated by an armature 270. One side of the coil 264 is connected with the relay terminal 236 and the other side with the terminal 272. When the coil 264 is deenergized, the armature 270 is biased by spring means to close the switch 266. On the other hand, when the coil 264 is energized the armature 270 is pulled towards the core 274 thereby opening the switch 266 and closing the switch 268. The armature 270 is connected by a conductor 276 with a terminal 278 of the relay from which a conductor 280 extends to one side of a switch 282 of a centrifugal governor generally designated by the numeral 284, the other side of the switch 282 being connected to ground through a spring arm 286 and conductor 288. The governor includes a second switch 290 which connects by the conductors 292, 294 with the terminal 272 of the relay. The governor switch 282 is normally held closed below a predetermined vehicle speed corresponding, for example, to 10 M. P. H. vehicle speed, and the switch 290 is a normally open switch which is closed when the switch 282 opens above a vehicle speed of 10 M. P. H. The governor is of the centrifugal type and is driven by a gear 296 on the shaft 12, as seen in Figure 5, which meshes with the governor pinion 298. As the vehicle speed is increased from a standstill the governor mechanism effects a movement of the spring arm 286 to open the switch 282 and close the switch 290. The terminal 236 of the relay also connects with one terminal 300 of the valve operating solenoid S through a conductor 302, the other terminal 304 of the solenoid being connected through the conductor 306 and conductor 260 with the terminal 262 of the relay. Energization of the solenoid S shuts off the supply of pressure fluid to the motor N and deenergization thereof opens the valve to admit pressure fluid to the motor N while simultaneously closing the vent 138. The solenoid S is controlled by the governor 284 through the relay 238. The control circuiting also includes means for grounding the engine ignition system and in this connection the relay switch 266 controlling the same is connected to a terminal 308 of the relay which in turn is connected by a conductor 310 with a terminal 312 of a manually operable lockout switch 314, the other terminal 316 of which is connected by a conductor 318 with one side 320 of the ignition coil 322. The switch 314 is normally closed and is opened only when it is desired to permanently prevent ignition interruption from occurring.

The terminal 236 of the relay is also connected by means of the conductor 234 with the terminal 324 of a conventional magnetic anti-stall device 326, a second terminal 328 of which is connected by a conductor 330 with the terminal 272 of the relay through a conductor 294.

The anti-stall device provides an anti-stall or dashpot action on the throttle operation to prevent the engine from being starved if the accelerator is quickly released. It functions only when the governor switch 282 is closed and the switch 290 is open (i. e. below governor upshift speed). In the carburetor 342 are two compartments connected by a small passage. One compartment contains a piston which moves downwardly against a spring bias when the accelerator is released. The action of the piston is to force gas from this compartment into the adjoining one wherein there is located a ball valve whose seating and unseating is controlled by a solenoid positioned on the carburetor housing. When the solenoid is energized, the ball is held off its seat and the entering gas can go around the ball and discharge from the valve compartment through large outlets. However, if the solenoid is deenergized, the ball is seated thus closing off the large outlets for the gas and compelling the gas to be forced through a restricted bleed opening. This restriction has a dashpot effect on the action of the piston and slows up movement of the accelerator in moving to its released position. It is noteworthy that the solenoid is energized when the kickdown switch 332 is closed by the accelerator pedal 340, but the anti-stall is then not effective because the ball is off its seat.

In order to provide for obtaining greater acceleration as when passing another vehicle, through downshifting of the planetary mechanism, provision is made in the control circuiting for a manually controlled switch, for example, a snap switch 332, one side of which 334 is grounded and the other side connected by conductors 336, 306, and 260 with the terminal 262 of the relay. By preference this switch is operated by the accelerator padel 340 (Figure 2) which is adapted to close the switch at or beyond wide open position of the throttle 342 and will remain closed over a predetermined range of movement of the accelerator pedal, toward the released position of the latter, before the switch is opened whereby to permit operation of the vehicle in the downshifted range, as long as desired, by the vehicle operator. The lost motion connection 346 is provided in the accelerator linkage to facilitate operation of the switch beyond wide open throttle position, and a lever 348 is provided to facilitate the aforesaid controlled operation of the kickdown switch 332.

The operation of the transmission as a whole will now be described.

Let it be assumed that the vehicle is at rest with the ignition switch 226 open, the clutch sleeve Q and low-reverse gear 217 in their neutral position, and the pawls 212 of the centrifugal clutch G disengaged. If the ignition switch 226 be now closed the solenoid S will be energized by current flowing from the battery 220 through the closed switch 226, conductors 228, 232, 234, 302, solenoid S, conductors 306, 260, relay switch 266, conductors 276, 280, closed governor switch 282, ground conductor 288 and back to battery 220. Energization of the solenoid S causes plunger 140 thereof to move downwardly in Figure 6 and actuate the valve plunger 134 downwardly against the resistance of spring 136 to close port 139, and open port 137. This shuts off communication between the fluid passages 124 and 142 and connects passages 138 and 142 to permit venting of fluid in the motor N, such that the springs 118 of the planetary will actuate the control member 64 to its rearward position holding the sun gear 80 of the planetary stationary by means of the brake 114.

The engine A is then started in the usual manner, pump P delivering fluid under pressure into the main fluid delivery passage 124. Since the port 139 of valve V is closed it will be evident that when sufficient pressure has built up the valve R will open to permit fluid to flow through the outlet 126 into the lubrication passages, not shown, or to the sump 120. The impeller 22 of the fluid coupling will now rotate at engine speed and there will be very little slip in the coupling at this time due to the drag of the coupling seal 350 between the impeller and runner and the light load imposed on the coupling at this time. Hence the pawl carrier 154 will rotate at a speed slightly under engine speed but not sufficiently high to effect centrifugal movement of the pawls against the bias of its governor springs. In any event, even if a high engine idle condition exists, the pawls will not engage with the windows 192 of the shell 182 of the clutch because their outward movement is blocked by the balk ring 214 previously referred to. Moreover, there will be no drive between the gear 174 and the clutch sleeve Q since the sleeve Q is in neutral position and in this position the sleeve holds the cage 204 of the overrunning clutch J such that no drive is possible through the overrunning clutch J in either direction.

In order to obtain forward movement of the vehicle, the driver will first release the main clutch E by depressing the clutch pedal 31 so as to permit shifting of the transmission C into one or another of its starting drive conditions. Thus, if a low speed ratio drive is required, the low speed gear 217 will be manually shifted into engagement with the pinion 170. Since the planetary mechanism at this time is in its underdrive ratio the sun gear 80 being held from reverse rotation by the overrunning brake K and the friction brake 114 an overall low speed vehicle breakaway drive ratio numerically, preferably in the order of 13 to 1 (assuming an axle ratio of 3.5), will be established. The drive between the engine and the driven shaft 12 will be through the planetary annulus 50, pinions 76, and spider 72, intermediate shaft 66, drive pinion 150, gear 162, countershaft cluster 164, low speed pinion 170, and gear 217. Manifestly, the annulus 50 will be driven through the fluid coupling D and master clutch E from the engine A through the drive shaft 20 and first intermediate shaft 30.

Reverse drive, having an overall numerical value of 16 to 1, may be obtained by shifting the gear 217 rearwardly of its position in Figure 4 into engagement with the idler gear 219, this drive between the engine and the driven shaft 12 being through the fluid coupling D, the master clutch E, the planetary underdrive gearing, the drive pinion 50, gear 162, reverse pinion 172, idler 219, gear 217, and shaft 12. It will be understood that when shifting the gear 217 for obtaining either low or reverse drive the master clutch will first be released and will be re-engaged after the shift has been completed.

A relatively faster speed ratio drive in either low or reverse may be obtained through upshift in the planetary unit from underdrive to direct under control of the speed responsive governor 284. At a predetermined vehicle speed in low or reverse drive, for example 10 M. P. H., the governor switch 282 will open and the switch 290 will close. Closing of switch 290 will complete a circuit through the relay coil 264 from battery 220 causing the armature 270 of the relay to open its switch 266 thereby opening the circuit through the solenoid S to deenergize the same and permit the spring 136 of the valve V to lift the plunger 134 upwardly to close the port 137 and open the port 139 connecting the motor N to the passage 124 thereby permitting fluid pressure from the pump P to enter the cylinder of the motor N and to move the piston 106 forwardly to engage the planetary clutch 55 and release the brake 114. Engagement of the planetary clutch locks the sun gear and annulus together and establishes a 1:1 drive relationship between the shafts 20 and 66. The drive from the shaft 66 will be the same as in low or reverse drive described above. If the upshift is one from normal low speed drive, an overall accelerating ratio preferably in the order of 9.5 is provided. On the other hand, if the upshift is obtained in reverse a numerical ratio of around 11.0 will be preferably obtainable. It will be understood that provision may be made for a lockout switch on the low speed gear 217 shift rail to prevent an upshift in the planetary when the transmission is established in reverse.

Shift from low speed ratio drive into a faster speed ratio drive may also be obtained when the vehicle is being driven in breakaway ratio of the low speed range by releasing the master clutch E, returning the gear 217 to its neutral position and then shifting the clutch sleeve Q either forwardly to obtain overrunning second speed ratio drive or rearwardly to obtain two-way second speed ratio drive either having an overall numerical value of about 8.0.

Upon shifting the sleeve Q forwardly it will encounter the blocker element 212 and through this element apply pressure to the shell 182 to enable synchronizing of the shell with the shaft 12. As soon as synchronization occurs the clutch sleeve Q may pass by the blocker into engagement with the clutch teeth 180 of the shell and the sleeve will simultaneously release the control cage 204 of the overrunning clutch J such that this clutch may assume its locked or driving position and establish a one-way drive between the gear 174 and the shaft 12. The drive between the engine and the shaft 12 will then be through the fluid coupling D, the master clutch E, drive pinion 150, gear 162, pinion 168, gear 174, overrunning clutch J and shaft 12 when the master clutch E is re-engaged.

It will be understood that for most driving the aforesaid start in low speed drive will not be used but the driver will immediately start the vehicle in second speed by shifting the clutch sleeve Q from neutral as above described to either the overrunning drive position (breakaway second) or the two-way drive position in second speed.

Assuming the shift has been made to breakaway second, the driver by depressing the accelerator 340 may accelerate the vehicle in this overrunning drive for as long a time as desired, the various elements including the pawl carrier 154 being speeded up as the engine speed is increased by further throttle opening movement of the accelerator.

When a vehicle speed of about 10 M. P. H. is reached, the governor 284 will actuate switch 282 to open position and close switch 290 to complete a circuit from the battery 220 through the conductors 232, 234, coil 264, conductors 294, 292, switch 290 to battery 220 through ground 288, this energizing the delayed action relay solenoid 264. Energization of the solenoid 264 will actuate the relay armature 270 to open the switch 296 and close the switch 268. Opening of switch 266 opens the circuit between the battery and the valve solenoid S to de-energize the latter and permit the spring 136 of the valve mechanism to lift the valve plunger 134 upwardly thereby closing the vent passage port 137 and opening the pump passage port 139 to admit pressure fluid to the power shift motor N. Fluid pressure in the order of 45 pounds per square inch will flow into the cylinder 107 of motor N and piston 106 will be moved forwardly in Figure 4 to disengage the brake 114 and engage the disc clutch 55, of the planetary mechanism F. The planetary gear set is now locked up in 1:1 ratio drive, with the sun gear clutched to the annulus gear and being driven forwardly at the speed of the latter, which is permitted by the overrunning brake mechanism K. Hence, a stepup in the transmission driving ratio is obtained from breakaway drive in second speed to accelerating or overall third speed ratio drive having a numerical value of about 5.8. It will be noted that this stepup is accomplished during drive of the vehicle and without the necessity of any action on the part of the driver, such as releasing the accelerator pedal.

The vehicle will remain in this accelerating third speed ratio as long as the vehicle speed remains above 10 M. P. H. and the driver keeps the accelerator depressed. If the accelerator pedal be relaxed at or above 12 M. P. H. in third speed, a second upshift in the transmission will occur by the clutch G in the manner now to be described to establish fourth speed or overall direct drive in the transmission having a numerical value of 3.5. It will be observed that as the engine and vehicle speed is increased a speed will be reached where the pawls 212 will overcome the biasing effect of their governor springs and will try to move radially outwardly to engage the shell 182. By preference the resistance of the springs will be overcome at a vehicle speed of 12 M. P. H. However, the pawls will be restrained from becoming engaged by the balk ring 214 until such time as the rotative speeds of the pawl carrier 154 and of the shell 182 are synchronous. Engagement of the pawls will occur as described in the above mentioned Bucy et al. application when the driver releases the accelerator pedal sufficiently to effect a partial closing of the engine throttle so as to decelerate the engine and runner of the fluid coupling as well as the pawl carrier 154 to synchronize the carrier speed as indicated above with the speed of the shell, which is at this time being driven at a lower speed than the carrier 154 through the gear 174. When the speed of the pawl carrier reaches and begins to cross that of the shell 182, the shell through the friction connection with the balk ring 214 will effect a relative movement between the pawl pins 216 and the balk ring 214 to disengage the pins from the holding lands of the ring to permit the pawls to enter the windows 192 of the shell as soon as they become aligned therewith to establish direct drive in the countershaft unit. Since the planetary unit F is at this time also in direct drive the transmission will, as stated above, be established in overall direct drive ratio or fourth speed ratio.

The vehicle will now continue to be driven in fourth speed ratio drive so long as the speed thereof is in excess of 12 M. P. H. Once, however, the speed of the vehicle drops slightly below 12 M. P. H. the pawl governor springs which are capable of disengaging the pawls at a speed between 10 and 12 M. P. H. will act to retract the pawls from engagement with the shell 182. Disengagement of the pawls will thereupon re-establish accelerating third speed ratio drive, the countershaft mechanism being now established in overrunning second speed ratio drive by reason of the overrunning clutch J which automatically establishes this drive upon release of the pawls. The drive will now be through the planetary in direct drive and through the countershaft unit in second speed. Upon continued slowing down of the vehicle to below 10 M. P. H. governor 284 will operate to open the switch 290 and close the switch 282 thereof. Opening of the switch 290 will deenergize the coil of the relay solenoid 264 but the armature 270 of the relay will not immediately release to open the switch 268 thereof by reason of the provision of a coil 352 which delays the flux decay of the relay core. After a predetermined delay, for example, $\tfrac{3}{10}$ of a second, the switch 268 of the relay will open and the switch 266 will thereupon close to establish a circuit from the battery 220 through the solenoid S of the valve V, the governor switch 282 having previously closed to permit this to be accomplished. Energization of the solenoid S causes the operating rod 140 thereof to press downwardly against the valve plunger 134 to close off the port 139 of the pressure inlet passage 132 and open the port 137 of the vent passage 138 thereby venting the motor N and permitting the springs 118 of the planetary mechanism F to push the piston 106 of the motor N rearwardly to disengage the disc clutch 55 and engage the brake 114 to establish underdrive in the planetary mechanism, the overrunning clutch K being supplemented by the brake 114 to hold the sun gear from rotation. The transmission is now again established in breakaway second speed ratio, which as above stated, is the normal starting speed of the transmission. Thus during normal slowing down of the vehicle from fourth speed closely successive downshifts to accelerating third speed and breakaway second speed will be obtained.

Now it will be observed that the downshift speed just under 12 M. P. H. of the centrifugal clutch G is just immediately above the downshift speed of just under 10 M. P. H. of the planetary mechanism by the governor 284. This is by preference since initial downshifting of the planetary F serves to facilitate release of the pawls 212 under conditions wherein the pawls remain engaged even though the normal downshift speed of the clutch G has been reached. The lower downshifting speed of the planetary mechanism which, as is self-evident, downshifts automatically, provides a moment of no drive between release of the disc clutch 55 and engagement of the conical brake 114 and brake K, relieving any drive torque on the pawls 212 to permit their retraction by the governor spring means 215 which is at such time attempting to effect their release. Manifestly, where the stated torque condition should exist during normal downshifting, by slowing down of the vehicle, the planetary will downshift first and the centrifugal clutch G thereafter providing in effect successive downshifts of the transmission to alternate or kickdown third speed and breakaway second speed, the former providing a vehicle drive with the planetary in underdrive and the countershaft unit in direct and having a numerical value of about 4.9. However, many drivers prefer a vehicle operation utilizing a high idle engine speed and habitually make fast braking stops in bringing the car to rest. Under such conditions there is apt to be considerabe torque on the pawls 212 negativing their release by the normal retracting governor springs even where the above described momentary drive interruption is provided. Where it is desired to meet such extreme conditions our invention provides means for obtaining sufficient torque unloading by interruption of the ignition system of the vehicle during the period of time delay following deenergization of the relay solenoid 264 when the governor 284 calls for a downshift of the planetary. In this connection it will be observed from Figure 6 that during the period the relay switch 268 remains closed and the governor switch 282 is closed, the ignition will be grounded by a circuit established through the conductor 318, normally closed switch 314, conductor 316, switch 268, armature 270, conductors 276, 280, switch 282, spring contact 286, and ground conductor 288. This period of ignition interruption will permit the loading of the pawls to be relieved and enable their immediate release, the ignition system being re-established just as soon as the armature 270 of the relay is released by the aforesaid flux decay to open the switch 268 and close the switch 266.

Although the sequential downshifting of the countershaft unit and the planetary unit in that order or the reverse of these, occur one substantially immediately following the other, no discomfort or jolting is encountered by the vehicle driver or passengers, since at this time the vehicle is slowing down in speed.

When during drive of the vehicle in overall direct speed ratio faster acceleration is desired than that available therein, the kickdown function of the transmission may be resorted to and the vehicle transmission be downshifted to alternate or kickdown third speed. The kickdown mechanism is brought into operation by depression of the accelerator pedal 340 preferably to wide open throttle position, which action swings the lever 348 (Figure 2) about its pivot such that the finger of the lever engages the kickdown switch 332 to close this switch. Closing of the switch 332 completes a secondary circuit 224, 226, 228, 240, 232, 234, 302, S, 306, 336, 332, between battery 220 and ground conductor 334 energizing the solenoid S and effecting operation of the valve V to vent the motor N. Venting of the motor N immediately causes the control member 64 of the planetary to be shifted rearwardly by the springs 118 to disengage the disc clutch 55 and engage brake 114 and permit automatic operation of brake K to prevent reverse rotation of the sun gear 80. Locking of the sun gear against reverse rotation furnishes reaction for the planetary underdrive gearing and the vehicle will be immediately accelerated at increased speed and with increased torque under wide open throttle conditions and will continue to be driven in this kickdown speed ratio until the accelerator pedal is substantially released to engine idle position whereupon the lever 348 will re-open switch 332 and re-establish fourth speed in the transmission. It will be observed that the lost motion provided by lever 348 permits operation of the vehicle in kickdown third ratio by the operator through a considerable range of throttle opening and as long as desired. It will also be noted that establishment of the kickdown ratio is automatic and independent of operation of the relay 266 and requires no interruption of the power flow from the engine. Moreover, it is a two-way positive drive through the gearing of the planetary and the clutch G of the countershaft unit. Manifestly the clutch G will not be disengaged by the kickdown operation since the pawls are above their governor speed. However, if the vehicle is permitted to slow down while in the kickdown ratio to such a speed causing operation of the governor 284, to close its switch 282, the pawls 212 of the centrifugal clutch will be released and overall breakaway second drive in the transmission established with ignition interruption as described above.

If a positive two-way drive is desired in second speed ratio drive, such may be obtained by momentarily disengaging the master clutch E and shifting the clutch sleeve Q rearwardly into engagement with the clutch teeth 176 of the second speed gear 174. In this position the overrunning clutch J is neutralized by the sleeve Q and locked out of the gearing drive. Moreover, since the sleeve Q is now disengaged from the shell 182 of the centrifugal clutch a direct drive in the countershaft unit may not be obtained. However, an upshift from this positive two-way second speed ratio drive is obtainable in the planetary in the manner described above under governor control by upshifting the planetary from underdrive to direct drive therein. The two-way second speed ratio drive is particularly desirable when coasting down a hill in fourth speed, i. e., overall direct drive of the transmission, and it is desired to obtain a better positive coasting gear but the vehicle is above the governor speed at which it is possible to obtain a downshift in the planetary. In such case the driver will momentarily release the master clutch E to disengage the drive and shift the clutch sleeve out of engagement with the clutch teeth 180 and through the neutral position into engagement with the clutch teeth 176 of the second speed gear 174. If additional coasting is required, the same may of course be obtained by a downshift in the planetary to underdrive ratio either by slowing down the vehicle to a speed below governor speed through operation of the brake or by momentarily depressing the accelerator pedal to wide open throttle position to kickdown the planetary to the underdrive condition. It will be understood that the planetary underdrive ratio is particularly desirable as a coasting gear since in this ratio the drive shaft which is the shaft 12 of the transmission, drives the engine at an overspeed and hence creates more pumping action at the engine and better coasting resistance. It will also be understood that a desirable coasting effect may be obtained when the vehicle is in overall direct drive by merely kicking down the planetary unit to its underdrive ratio.

Under certain conditions of driving as when driving in mountainous country where considerable acceleration is required, it may be desirable to maintain the planetary unit in its underdrive ratio to avoid constant up and downshifting of this unit in response to changes in vehicle speed. For this purpose we provide a mountain control 242 (Figure 6) which comprises a normally open snap switch 244 arranged on the dash of the vehicle or other suitable and convenient place for the driver and a lamp 254 also arranged on the dash to indicate when the switch is being operated to perform its function. When the driver desires to maintain the planetary F in underdrive ratio he merely flips the switch 244 to its closed position thereby establishing a circuit through the solenoid S from the battery 220 independent of the relay 266, energizing this solenoid to actuate the valve V to close the pressure fluid passage 124 and open the fluid vent passage 138 so as to vent the motor N to release the clutch 55 and effect establishment of the planetary unit in its underdrive ratio, if it is not already therein, and maintain the planetary in this condition until the switch 244 is again opened by the driver. So long as the switch 244 is closed the lamp 254 will be lighted to inform the driver that the planetary unit is in underdrive ratio and is not available for automatic up and down shifting in response to changes in vehicle speed. Manifestly, the lamp 254 will go out when the switch 254 is again opened.

As a safety provision in such constructions of our transmission wherein ignition interruption is provided for aiding release of the pawls 212 below their retractable speed, we provide a switch 314 in the ignition interrupting circuit operable by the second speed shift rail when placing the manual selector into two-way second position for opening any ground connection which may be established with the ignition system by operation of the relay 266.

From the above description, it will be seen that we have provided a novel transmission, providing ample and desirable driving functions and that is simple in operation. Although the specific embodiment illustrated and described above is well adapted for carrying out the various objects of our invention, it will be understood hat various modifications, changes and substitutions may be made without departing from the spirit thereof. The invention is, therefore, to be construed to include all such modifications, changes and substitutions.

We claim:

1. A variable speed transmission comprising in combination a countershaft type unit having an underdrive and a direct drive ratio, a planetary type unit having an underdrive and direct drive ratio, said units being connected in tandem, with the planetary unit ahead of the countershaft unit, means for effecting a power shift from underdrive to direct in the planetary unit, means including a centrifugal pawl clutch for effecting a delayed shift between underdrive and direct drive in the countershaft unit and means for controlling the two said shifting means to effect sequential shifts from underdrive to direct in the planetary unit and from underdrive to direct in the countershaft unit and downshifts in the reverse order, said control means including switch means operable under control of the planetary unit shift effecting control means for facilitating downshifting in said countershaft unit.

2. A variable speed transmission comprising in combination a countershaft type unit having an underdrive and a direct drive ratio, a planetary type unit having an underdrive and direct drive ratio, said units being connected in tandem, with the planetary unit ahead of the countershaft unit, means for effecting a power shift from underdrive to direct in the planetary unit, means including a centrifugal pawl clutch for effecting a delayed shift between underdrive and direct drive in the countershaft unit and means for controlling the two said shifting means for effecting sequential upshifts from underdrive to direct in the planetary and underdrive to direct in the countershaft unit in either order and downshifts in either order, said control means being arranged to normally condition downshifting of said planetary unit at a vehicle speed immediately under the vehicle speed at which the centrifugal pawl clutch is disengageable.

3. A variable speed transmission comprising in combination, input and output members, a countershaft type unit having an underdrive and a direct drive ratio, a planetary type unit having an underdrive and a direct drive ratio, said units being connected in tandem with the planetary unit ahead of the countershaft unit, clutch means for effecting an automatic shift from underdrive to direct in the planetary unit, centrifugal pawl clutch means for effecting a shift between underdrive and direct drive in the countershaft unit, vehicle speed responsive means for controlling upshift by said planetary clutch means, means including a spring for controlling upshift by said centrifugal pawl clutch, said speed responsive means including means for controlling downshift of both of said clutch means.

4. In a power transmission for driving a motor vehicle having an engine; a pair of series arranged change speed mechanisms, one adapted to receive drive from the engine, and the other adapted to receive its drive from the first and to drive the vehicle, said one mechanism including friction clutch means engageable automatically to step up the speed ratio drive of said one mechanism and automatically disengageable to step down the speed ratio drive, the other mechanism including centrifugal pawl clutch means operable when the pawls are engaged to step up the speed ratio drive of said other mechanism and disengageable to step down said drive, the pawls of said centrifugal clutch means when engaged being subject to driving thrust during said stepped-up drive of said other mechanism so as to resist disengagement until the power delivery of the engine to said other mechanism is momentarily diminished, governor means for controlling step-up of said one mechanism and step-down thereof after said pawls are conditioned for disengagement and means operable in response to step-down conditioning of said governor means for momentarily diminishing the power flow to said other mechanism to facilitate disengagement of said pawls of said other mechanism.

5. A power transmission as claimed in claim 4 wherein the said one mechanism is a planetary gearing and wherein said other mechanism is a countershaft gearing.

6. In a power transmission for driving a motor vehicle having an engine and a driver operable engine throttle control; a pair of series arranged change speed mechanisms, one adapted to receive drive from the engine, and the other adapted to receive its drive from the first and to drive the vehicle, said one mechanism including friction clutch means engageable automatically to step up the speed ratio drive of said one mechanism and automatically disengageable to step down the speed ratio drive, the other mechanism including centrifugal pawl clutch means operable when the pawls are engaged to step up the speed ratio drive of said other mechanism and disengageable to step down said drive, the pawls of said centrifugal clutch means when engaged being subject to driving thrust during said stepped-up drive of said other mechanism so as to resist disengagement until the power delivery of the engine to said other mechanism is momentarily diminished, governor means for controlling step-up of said one mechanism and step-down thereof after said pawls are conditioned for disengagement, means operable in response to step-down conditioning of said governor means for momentarily diminishing the power flow to said other mechanism to facilitate disengagement of said pawls and thereby step down of said other mechanism, and means operable by said driver throttle control for downshifting said one mechanism independently of said power diminishing means.

7. In a power transmission for driving a motor vehicle having an engine; a pair of series arranged change speed mechanisms, one adapted to receive drive from the engine, and the other adapted to receive its drive from the first and to drive the vehicle, said one mechanism including friction clutch means engageable automatically to step up the speed ratio drive of said one mechanism and automatically disengageable to step down the speed ratio drive, the other mechanism including centrifugal pawl clutch means operable when the pawls are engaged to step up the speed ratio drive of said other mechanism and disengageable to step down said drive, the pawls of said centrifugal clutch means when engaged being subject to driving thrust during said stepped-up drive of said other mechanism so as to resist disengagement until the power delivery of the engine to said other mechanism is momentarily diminished, power operable means for effecting engagement and disengagement of said friction clutch means, governor means for controlling operation of said power means operable for effecting clutch disengaging operation thereof after said pawls are conditioned for disengagement and means operable in response to step-down conditioning of said governor means for momentarily diminishing the power flow to said other mechanism to facilitate disengagement of said pawls of said other mechanism.

8. In a power transmission for driving a motor vehicle having an engine; a pair of series arranged change speed mechanisms, one adapted to receive drive from the engine, and the other adapted to receive its drive from the first and to drive the vehicle, said one mechanism including friction clutch means engageable automatically to step up the speed ratio drive of said one mechanism and automatically disengageable to step down the speed ratio drive, the other mechanism including centrifugal pawl clutch means operable when the pawls are engaged to step up the speed ratio drive of said other mechanism and conditionable for disengagement to step down said drive substantially immediately prior to disengaging operation of said friction clutch means, the pawls of said centrifugal clutch means when engaged being subject to driving thrust during said stepped-up drive of said other mechanism so as to resist disengagement until the power delivery of the engine to said other mechanism is momentarily diminished, a differential pressure fluid operated motor for actuating said friction clutch means, a solenoid operated valve for controlling the fluid pressure conditioning of said motor, governor means for controlling operation of said solenoid valve, and means operable in response to operation of said governor means for effecting step-down operation of said one mechanism and substantially simultaneously effecting a diminishing of the power flow to said other mechanism to facilitate disengagement of the pawls of said other mechanism.

9. In a power transmission for driving a motor vehicle having an engine provided with an electrical ignition circuit, a pair of series arranged change speed mechanisms, one adapted to receive drive from the engine, the other adapted to receive its drive from the first mechanism and adapted to drive the vehicle, said one mechanism including friction drive control elements engageable to step up the speed ratio drive in said one mechanism and disengageable to step down the speed ratio drive through said one mechanism, the other mechanism including a centrifugal pawl clutch having a centrifugally responsive pawl engageable at predetermined speed to step up the speed ratio drive of said other mechanism and having spring retracting means for disengaging said pawl below said engaging speed, said pawl when engaged being subject to driving thrust during the stepped up drive of said other mechanism so as to resist disengagement until said thrust is relieved sufficiently to enable disengagement of the pawl by said retracting means, servomotor means for actuating said friction drive control elements, governor means operable at predetermined speed below the pawl engaging speed for operating said servomotor means to automatically engage said drive control elements and operable below said predetermined speed at which said control elements are engageable to actuate said servo means to automatically disengage said control elements, and means responsive to the latter operation of said governor means for momentarily interrupting the engine ignition circuit to interrupt the power delivery of the engine to said other mechanism whereby to relieve any excessive thrust on said pawl if then still engaged.

10. In a power transmission for driving a motor vehicle having an internal combustion engine, a first shaft adapted to be drivingly connected to the engine, an intermediate shaft, a driven shaft adapted to drive the vehicle, a planetary change speed means driven by said first shaft and arranged to drive said intermediate shaft, a countershaft type change speed means driven by said intermediate shaft and arranged to drive said driven shaft, said planetary means having friction clutch means automatically operable to step up the speed ratio drive between said first shaft and said intermediate shaft and automatically operable to step-down this drive, said countershaft means having centrifugal pawl clutch means engageable to step up the speed ratio drive between said intermediate shaft and said driven shaft and being conditionable for disengagement substantially immediately prior to effecting said step-down operation of said friction clutch means, the pawls of said clutch when engaged being subject to driving thrust during said stepped up drive by said intermediate shaft so as to resist disengagement of said pawls until the power delivery of the engine to said intermediate shaft is momentarily diminished, governor means operable for controlling step-down operation of said friction clutch means and simultaneously operable for effecting momentary diminishing of the power delivery of the engine to said intermediate shaft whereby to control disengagement of said pawl clutch means.

11. In a power transmission for driving a motor vehicle having an engine provided with an electrical ignition circuit and a driver manipulated throttle control; a pair of series arranged change speed mechanisms, one adapted to receive drive from the engine, the other adapted to receive its drive from the first mechanism and adapted to drive the vehicle, said one mechanism including friction drive control elements engageable to step up the speed ratio drive in said one mechanism and disengageable to step down the speed ratio drive through said one mechanism, the other mechanism including a centrifugal pawl clutch having a centrifugally responsive pawl engageable at predetermined speed to step up the speed ratio drive of said other mechanism and having spring retracting means for disengaging said pawl below said engaging speed, said pawl when engaged being subject to driving thrust during the stepped up drive of said other mechanism so as to resist disengagement until said thrust is relieved sufficiently to enable disengagement of the pawl by said retracting means, servomotor means for actuating said friction drive control elements, governor means operable at predetermined speed below the pawl engaging speed for operating said servomotor means to automatically engage said drive control elements and operable below said predetermined speed at which said control elements are engageable to actuate said servo means to automatically disengage said control elements, means responsive to the latter operation of said governor means for momentarily interrupting the engine ignition circuit to interrupt the power delivery of the engine to said other mechanism whereby to relieve any excessive thrust on said pawl if then still engaged, and means operable in response to operation of said driver control for effecting disengagement of said friction drive control elements independently of said governor means and without interrupting said ignition circuit.

12. In a power transmission for driving a motor vehicle having an engine provided with an electrical ignition circuit, a pair of series arranged change speed mechanisms, one adapted to receive drive from the engine, the other adapted to receive its drive from the first mechanism and adapted to drive the vehicle, said one mechanism including friction drive control elements engageable to step up the speed ratio drive in said one mechanism and disengageable to step down the speed ratio drive through said one mechanism, the other mechanism including a centrifugal pawl clutch having a centrifugally responsive pawl engageable at predetermined speed to step up the speed ratio drive of said other mechanism and having spring retracting means for disengaging said pawl below said engaging speed, said pawl when engaged being subject to driving thrust during the stepped up drive of said other mechanism so as to resist disengagement until said thrust is relieved sufficiently to enable disengagement of the pawl by said retracting means, servomotor means for actuating said friction drive control elements, governor means operable at predetermined speed below the pawl engaging speed for operating said servomotor means to automatically engage said drive control elements and operable below said predetermined speed at which said control elements are engageable to actuate said servo means to automatically disengage said control elements, means responsive to the latter operation of said governor means for momentarily interrupting the engine ignition circuit to interrupt the power delivery of the engine to said other mechanism whereby to relieve any excessive thrust on said pawl if then still engaged, and means operable to overrule the immediately preceding means.

13. In a power transmission for driving a motor vehicle having an engine provided with an electrical ignition circuit, a pair of series arranged change speed mechanisms, one adapted to receive drive from the engine, the other adapted to receive its drive from the first mechanism and adapted to drive the vehicle, said one mechanism including friction drive control elements engageable to step up the speed ratio drive in said one mechanism and disengageable to step down the speed ratio drive through said one mechanism, the other mechanism including a centrifugal pawl clutch having a centrifugally responsive pawl engageable at predetermined speed to step up the speed ratio drive of said other mechanism and having spring retracting means for disengaging said pawl below said engaging speed, said pawl when engaged being subject to driving thrust during the stepped up drive of said other mechanism so as to resist disengagement until said thrust is relieved sufficiently to enable disengagement of the pawl by said retracting means, servomotor means for actuating said friction drive control elements, governor means operable at predetermined speed below the pawl engaging speed for operating said servomotor means to automatically engage said drive control elements and operable below said predetermined speed at which said control elements are engageable to actuate said servo means to automatically disengage said control elements, means responsive to the latter operation of said governor means for momentarily interrupting the engine ignition circuit to interrupt the power delivery of the engine to said other mechanism whereby to relieve any excessive thrust on said pawl if then still engaged, and means for overruling said governor means to prevent engagement of said friction drive control elements.

14. In a power transmission for driving a motor vehicle having an engine provided with an electrical ignition circuit, a pair of series arranged change speed mechanisms, one adapted to receive drive from the engine, the other adapted to receive its drive from the first mechanism and adapted to drive the vehicle, said one mechanism including friction drive control elements engageable to step up the speed ratio drive in said one mechanism and disengageable to step down the speed ratio drive through said one mechanism, the other mechanism including a centrifugal pawl clutch having a centrifugally responsive pawl engageable at predetermined speed to step up the speed ratio drive of said other mechanism and having spring retracting means for disengaging said pawl below said engaging speed, said pawl when engaged being subject to driving thrust during the stepped up drive of said other mechanism so as to resist disengagement until said thrust is relieved sufficiently to enable disengagement of the pawl by said retracting means, servomotor means for actuating said friction drive control elements, governor means operable at predetermined speed below the pawl engaging speed for operating said servomotor means to automatically engage said drive control elements and operable below said predetermined speed at which said control elements are engageable to actuate said servo means to automatically disengage said control elements, means responsive to the latter operation of said governor means for momentarily interrupting the engine ignition circuit to interrupt the power delivery of the engine to said other mechanism whereby to relieve any excessive thrust on said pawl if then still engaged, means for overruling said governor means to prevent engagement of said friction drive control elements and visual means for indicating the said overruling means is in operation and operative only so long as said overruling means is operative.

15. In a power transmission for driving a motor vehicle having an engine provided with an electrical ignition circuit and a driver manipulated throttle control; a planetary underdrive change speed mechanism arranged in tandem ahead of a countershaft change speed mechanism, the planetary mechanism adapted to receive drive from the engine, the countershaft mechanism adapted to receive its drive from the planetary mechanism and adapted to drive the vehicle, said planetary mechanism including friction drive control elements engageable for establishing a direct drive in said planetary mechanism and disengageable for effecting a gearing underdrive therein, said countershaft mechanism including a centrifugal pawl clutch having a centrifugally responsive pawl engageable at predetermined speed to establish a direct drive in said countershaft mechanism and having spring retracting means for disengaging said pawl below said engaging speed, differential fluid pressure operated motor means for actuating said friction drive control elements, a valve for controlling the differential fluid pressure operation of said motor means, electromagnetic means for operating said valve, speed responsive governor means including a first switch operable at a predetermined speed below said pawl engaging speed for controlling engagement of said friction drive control elements, and operable below this predetermined speed for controlling disengagement of said drive control elements, and a second switch operable when said first switch has been operated to effect engagement of said drive control elements, a delayed action relay having an energizing coil electrically in series with said second governor switch and having a first switch and a second switch, said first relay switch controlling said electromagnetic means and said second relay switch controlling said ignition circuit in conjunction with said second governor switch, and a further switch in series electrically with said electromagnetic means and operable by said driver control for overruling said second governor switch.

16. In a power transmission for driving a motor vehicle having an engine provided with an electrical ignition circuit; a planetary underdrive change speed mechanism arranged in tandem ahead of a countershaft change speed mechanism, the planetary mechanism adapted to receive drive from the engine, the countershaft mechanism adapted to receive its drive from the planetary mechanism and adapted to drive the vehicle, said planetary mechanism including friction drive control elements engageable for establishing a direct drive in said planetary mechanism and disengageable for effecting a gearing underdrive therein, said countershaft mechanism including a centrifugal pawl clutch having a centrifugally responsive pawl engageable at predetermined speed to establish a direct drive in said countershaft mechanism and having spring retracting means for disengaging said pawl below said engaging speed, differential fluid pressure operated motor means for actuating said friction drive control elements, a valve for controlling the differential fluid pressure operation of said motor means, electromagnetic means for operating said valve, speed responsive governor means including a first switch operable at a predetermined speed below said pawl engaging speed for controlling engagement of said friction drive control elements, and operable below this predetermined speed for controlling disengagement of said drive control elements, and a second switch operable when said first switch has been operated to effect engagement of said drive control elements, and a delayed action relay having an energizing coil electrically in series with said second governor switch and having a first switch and a second switch, said first relay switch controlling said electromagnetic means and said second relay switch controlling said ignition circuit in conjunction with said second governor switch.

17. In a power transmission for driving a motor vehicle having an engine provided with an electrical ignition circuit and a driver manipulated throttle control; a planetary underdrive change speed mechanism arranged in tandem ahead of a countershaft change speed mechanism, the planetary mechanism adapted to receive drive from the engine, the countershaft mechanism adapted to receive its drive from the planetary mechanism and adapted to drive the vehicle, said planetary mechanism including friction drive control elements engageable for establishing a direct drive in said planetary mechanism and disengageable for effecting a gearing underdrive therein, said countershaft mechanism including a centrifugal pawl clutch having a centrifugally responsive pawl engageable at predetermined speed to establish a direct drive in said countershaft mechanism and having spring retracting means for disengaging said pawl below said engaging speed, differential fluid pressure operated motor means for actuating said friction drive control elements, a valve for controlling the differential fluid pressure operation of said motor means, electromagnetic means for operating said valve, speed responsive governor means including a first switch operable at a predetermined speed below said pawl engaging speed for controlling engagement of said friction drive control elements, and operable below this predetermined speed for controlling disengagement of said drive control elements; and a second switch operable when said first switch has been operated to effect engagement of said drive control elements, a delayed action relay having an energizing coil electrically in series with said second governor switch and having a first switch and a second switch, said first relay switch controlling said electromagnetic means and said second relay controlling said ignition circuit in conjunction with said second governor switch, a further switch in series electrically with said electromagnetic means and operable by said driver control for overruling said second governor switch, another switch in series electrically with said second relay switch for overruling the same and still another switch in series electrically with said electromagnetic means and in parallel with said driver control switch for overruling said second governor switch.

18. In a power transmission for driving a motor vehicle having an engine provided with an electrical ignition circuit, a pair of series arranged change speed mechanisms, one adapted to receive drive from the engine, the other adapted to receive its drive from the first mechanism and adapted to drive the vehicle, said one mechanism including friction drive control elements engageable to step up the speed ratio drive in said one mechanism and disengageable to step down the speed ratio drive through this one mechanism, the other mechanism including positively engageable clutch means engageable at predetermined speed to step up the speed ratio drive of the said other mechanism and disengageable below said engaging speed, said positively engageable means being subject to driving thrust during the stepped-up drive of said other mechanism so as to resist disengagement until said thrust is relieved sufficiently to enable disengagement of said positively engageable means, means for actuating said friction drive control elements, governor means operable at predetermined speed below the engaging speed of said positively engageable means for effecting operation of said actuating means to automatically engage said drive control elements and operable below said predetermined speed at which said control elements are engageable to effect operation of said actuating means to automatically disengage said control elements, the said speed at which said control elements are disengageable being below the speed at which said positively engageable means are disengageable and means responsive to the latter operation of said governor means for momentarily interrupting the engine ignition circuit to interrupt the power delivery of the engine to said other mechanism whereby to relieve any excessive thrust on said positively engageable means if then still engaged.

19. In a power transmission for driving a motor vehicle having an engine provided with an electrical ignition circuit and a driver-manipulated throttle control, a pair of series arranged change speed mechanisms, one adapted to receive drive from the engine, the other adapted to receive its drive from the first mechanism and adapted to drive the vehicle, said one mechanism including friction drive control elements engageable to step up the speed ratio drive in said one mechanism and disengageable to step down the speed ratio drive through this one mechanism, the other mechanism including positively engageable clutch means engageable at predetermined speed to step up the speed ratio drive of the said other mechanism and disengageable below said engaging speed, said positively engageable means being subject to driving thrust during the stepped-up drive of said other mechanism so as to resist disengagement until said thrust is relieved sufficiently to enable disengagement of said positively engageable means, means for actuating said friction drive control elements, governor means operable at predetermined speed below the engaging speed of said positively engageable means for effecting operation of said actuating means to automatically engage said drive control elements and operable below said predetermined speed at which said control elements are engageable to effect operation of said actuating means to automatically disengage said control elements, the said speed at which said control elements are disengageable being below the speed at which said positively engageable means are disengageable means responsive to the latter operation of said governor means for momentarily interrupting the engine ignition circuit to interrupt the power delivery of the engine to said other mechanism whereby to relieve any excessive thrust on said positively engageable means if then still engaged, and means operable in response to operation of said driver control for effecting disengagement of said friction drive control elements independently of said governor means and without interrupting said ignition circuit.

20. In a power transmission for driving a motor vehicle having an engine provided with an electrical ignition circuit, a pair of series arranged change speed mechanisms, one adapted to receive drive from the engine, the other adapted to receive its drive from the first mechanism and adapted to drive the vehicle, said one mechanism including friction drive control elements engageable to step up the speed ratio drive in said one mechanism and disengageable to step down the speed ratio drive through this one mechanism, the other mechanism including positively engageable clutch means engageable at predetermined speed to step up the speed ratio drive of the said other mechanism and disengageable below said engaging speed, and further clutch means operable to establish a two-way drive around said positively engageable clutch means, said positively engageable means being subject to driving thrust during the stepped-up drive of said other mechanism so as to resist disengagement until said thrust is relieved sufficiently to enable disengagement of said positively engageable means, means for actuating said friction drive control element, governor means operable at predetermined speed below the engaging speed of said positively engageable means for effecting operation of said actuating means to automatically engage said drive control elements and operable below said predetermined speed at which said control elements are engageable to effect operation of said actuating means to automatically disengage said control elements, means responsive to the latter operation of said governor means for momentarily interrupting the engine ignition circuit to interrupt the power delivery of the engine to said other mechanism whereby to relieve any excessive thrust on said positively engageable means if then still engaged, and means operable to overrule the immediately preceding means so as to prevent said ignition interruption when said further clutch means is engaged to establish said two-way drive.

21. In a power transmission for driving a motor vehicle having an engine provided with means for diminishing the engine power delivery, a pair of series arranged change speed mechanisms, one adapted to receive drive from the engine, the other adapted to receive its drive from the first mechanism and adapted to drive the vehicle, said one mechanism including friction drive control elements engageable to step up the speed ratio drive in said one mechanism and disengageable to step down the speed ratio drive through this one mechanism, the other mechanism including positively engageable clutch means engageable at predetermined speed to step up the speed ratio drive of the said other mechanism and disengageable below said engaging speed, said positively engageable means being subject to driving thrust during the stepped-up drive of said other mechanism so as to resist disengagement until said thrust is relieved sufficiently to enable disengagement of said positively engageable means, means for actuating said friction drive control elements, governor means operating at predetermined speed below the engaging speed of said positively engageable means for effecting operation of said actuating means to automatically engage said drive control elements, and operating below said predetermined speed at which said control elements are engageable to effect operation of said actuating means to automatically disengage said control elements, manually operable control means for conditioning said other mechanism in a different speed ratio drive from that establishable by said positively engageable clutch means, means responsive to said control element disengaging operation of said governor means for controlling the engine power diminishing means for momentarily diminishing the power delivery of the engine to said other mechanism whereby to relieve any excessive thrust on said positively engageable means if then still engaged, and switch means operable by said manually operable control means incident to establishing said different speed ratio drive for overruling the immediately preceding means whereby to prevent diminishing of said engine power.

22. In a power transmission for driving a motor vehicle having an engine provided with means for diminishing the engine power delivery, speed ratio changing mechanism including manually operable clutch means operable for establishing a one-way starting drive of the transmission or a two-way starting drive thereof, a further clutch means operable for stepping up said starting drives and positively engageable clutch means for stepping up said stepped-up one-way drive, said positively engageable clutch means being subject to driving thrust during drive of the vehicle when said positively engageable clutch means is engaged so as to resist disengagement until said thrust is released sufficiently to enable disengagement of this positive clutch means, governor means for controlling stepup drive by said further clutch means and for controlling operation of said engine power diminishing means for effecting disengagement of said positively engageable clutch means, and means operable by said manually operable means as an incident to establishing said two-way starting drive for overruling operation of said engine power diminishing means by said governor means and thereby prevent diminishing of the engine power delivery.

23. In a power transmission for driving a motor vehicle; a first change speed mechanism including drive control means operable for stepping up and stepping down the speed ratio drive of said transmission, and a second change speed mechanism including interengageable drive control means engageable for stepping up the speed ratio drive of said transmission after said first mechanism has stepped up the same and disengageable for stepping down the speed ratio drive of said transmission, a first speed responsive control means operable for controlling the stepup and stepdown operations of the drive control means of said first mechanism, and a second speed responsive control means operable for controlling the stepup operation of said interengageable means of said second mechanism and operable for mobilizing said interengageable drive control means for the stepdown operation of said second mechanism, said first speed responsive control means being also operable when stepping down the speed ratio drive of said first mechanism for effectuating the stepdown operation of said interengageable drive control means of said second mechanism mobilized by said first speed responsive control means.

EDWIN R. MAURER.
AUGUSTIN J. SYROVY.

References Cited in the file of this patent

UNITED STATES PATENTS

| Number | Name | Date |
|---|---|---|
| 2,262,747 | Banker | Nov. 18, 1941 |
| 2,328,392 | Neracher | Aug. 31, 1943 |
| 2,333,115 | Neracher | Nov. 2, 1943 |
| 2,343,312 | Maurer | Mar. 7, 1944 |
| 2,348,763 | Syrovy et al. | May 16, 1944 |